N. ARCHIBALD.
Device for Unloading Header Wagon.
No. 205,231. Patented June 25, 1878.
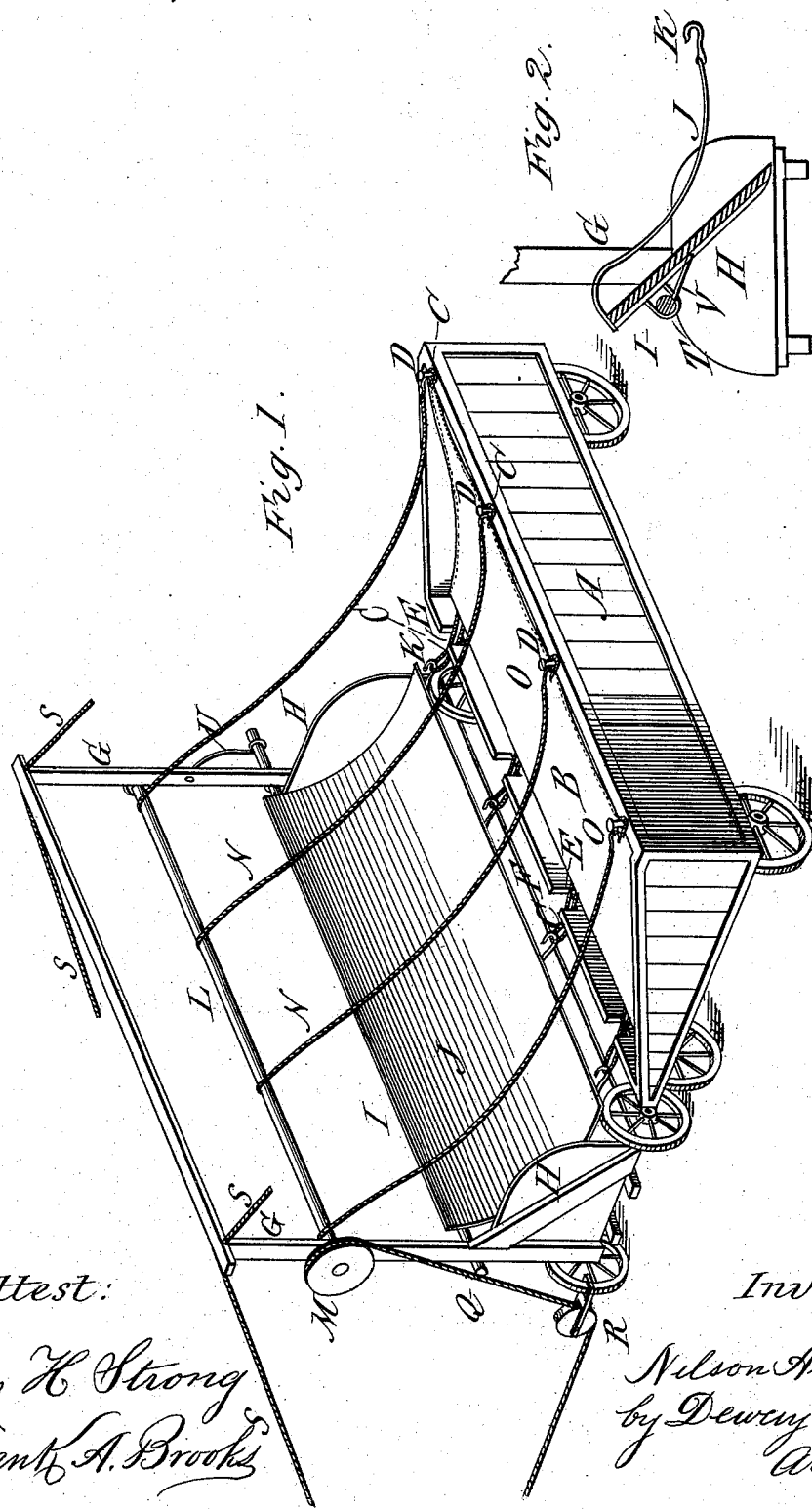
Attest:
Geo H Strong
Frank A Brooks
Inventor
Nelson Archibald
by Dewey & Co,
Attys

UNITED STATES PATENT OFFICE.

NELSON ARCHIBALD, OF HANFORD, CALIFORNIA.

IMPROVEMENT IN DEVICES FOR UNLOADING HEADER-WAGONS.

Specification forming part of Letters Patent No. 205,231, dated June 25, 1878; application filed May 16, 1878.

*To all whom it may concern:*

Be it known that I, NELSON ARCHIBALD, of Hanford, county of Tulare, and State of California, have invented a Device for Unloading Header-Wagons; and I do hereby declare the following to be a full, clear, and exact description thereof, reference being had to the accompanying drawings.

My invention relates to that class of devices for unloading header-wagons in which a netting is placed in the wagon before the load is put on, so that by removing the netting in a suitable manner the whole load is taken from the wagon at once.

It consists in the employment of two nettings, one in the header-wagon on which the load is placed, and the other on the unloader, so that, by joining the two nettings together when the wagon is driven up alongside of the unloader and raising one edge of the netting by appropriate means, the load is rolled from the wagon to the unloader, and thence at one operation to the stack.

It also consists in the use of a roller having ropes attached to it, with hooks, which engage with loops on the header-wagon netting, so that as the power is applied to the roller the ropes are shortened, the netting is drawn up by one edge, and the load is dumped.

The back of the unloader is made adjustable, and to it the unloader-netting is attached, so that the back can be adjusted to any desired angle, admitting of the load being dumped either high or low, to suit the varying height of stack.

In the accompanying drawings, Figure 1 is a perspective view of my device. Fig. 2 is a section of the same.

Let A represent the body of the header-wagon, which is made in the usual form. Inside of this body is laid the netting B, on the upper and lower edges of which are the loops or rings C. The loops C on one side of the netting hook over the pegs D on the higher side of the body of the header-wagon, and the loops on the other edge lie in the grooves E on the lower edge, as shown. The netting B is thus kept in the proper position while the load is deposited on it.

In combination with this header-wagon and netting, I provide an unloading device, by means of which the hay, straw, or grain is taken from the header-wagon in bulk and piled up in a stack to any desired height. F represents the bed-frame of this unloader; G, the vertical or side frames, and H the sides, the whole being mounted on wheels for convenience in moving. The back I is made adjustable, so as to be set at any desired angle, as hereinafter described. To the top of this adjustable back is secured another netting, J, on the lower edge of which are several hooks, K, corresponding in number and position to the loops C on the lower edge of the netting resting in the grooves E on the header-wagon.

Between the upright frames G of the unloader is placed the transverse bar or roller L, having on one end the pulley M. Attached to this bar or roller L, at proper intervals, are a number of ropes or cords, N, with hooks O fastened to their other ends, which are intended to hook into the loops C of the netting B on the upper side of the header-wagon, where said loops drop over the pegs D.

On one end of the transverse bar or roller L is a pulley, M, around which passes a rope, Q, to which a horse is attached. A leader, R, is fastened to the spoke or felly of a wheel of the unloaders, and has at one end a small pulley, under which the rope Q is brought from the pulley M on the roller-bar, as shown, so as to bring the lead of the driving-rope in the most convenient position for the draft of the horse. The ropes S serve as guys, to prevent the unloader from turning over when the strain of drawing a load is brought upon it.

The load of grain, hay, or straw being placed in the netting B in the header-wagon, the wagon is driven up alongside of the unloader, so that the lower edge of the body of the header-wagon is immediately in front of and parallel with the front or low side of the unloader. Then the loops C are in the proper position to receive the hooks K in the edge of the netting in the unloader; and when these hooks and loops are engaged the two nettings B and J are virtually one piece.

The lines or ropes N, which are fastened to the roller-bar L, are brought over, and their hooks O engaged with the loops C on the upper or higher side of the header-wagon, where they hang on the pegs D. By throwing these loops C off of the pegs, the netting B, with its load, is entirely disengaged from the header-wagon and ready for removal from it.

As the horse draws on the line Q, which passes under the leading pulley and around the pulley M on the transverse roller L, this roller is revolved, and winds the ropes or cords N around it. As the hooks O on these cords are attached to the loops C in the netting B on the higher side of header-wagon, the netting B is driven toward the roller L, bringing with it the load of hay, grain, or straw.

As the horse moves on, the upper edge of the netting B is drawn up by the cords N until it becomes nearly vertical, and the load is rolled out behind the unloader onto the stack.

The two nettings being joined together, as described, form one whole netting, J; and as the upper edge of this netting J is fastened to the top part of the back I of the unloader, the load cannot fall out until it reaches the top of this back.

This back I of the unloader is so constructed as to be adjustable to any inclination to suit the height of the stack. In order that this may be accomplished, a transverse roller-bar, T, is passed through rings or journals on the under side of the back I near its top. Ropes or cords U are attached to the transverse roller and fastened to the upper part of the upright frame G of the unloader, thus supporting the roller and the adjustable back I, the lower edge of this back resting on the frame-work of the unloader between the sides H.

It will be seen that by revolving this transverse roller or bar T by means of a handspike or bar in the end, or other device, the ropes or cords U are wound around it; and, their upper ends being fastened to the upright frame, the transverse roller T is raised higher, and with it the upper part of the back I, the lower part of the back still resting on the frame between the sides H. By this means any inclination of the back may be had. With a low stack this back I would be nearly horizontal, and as the stack grew higher in the process of depositing loads upon it, the inclination of the back could be increased until it became nearly or wholly vertical.

The netting J attached to the back, as hereinbefore described, still remains in the proper position without reference to the varying in elevation of the adjustable back. Pins or bars V through the roller prevent its unwinding when the back is in any required position; and a ratchet, W, and pawl X on the main transverse roller L prevent the netting and load falling back in case the horse should cease pulling too soon, and before the load is thrown out over the back part of the unloader.

The grooves E, on the lower side of the header-wagon, form places in which the loops C lie, so that they are not covered by the load, and can always be reached, so as to engage the hooks on the other netting with them.

It will thus be seen that I provide a very useful device, combining an arrangement for both unloading wagons and building up stacks of grain, hay, or straw, without the necessity of having any other elevating device. The two nettings are so easily joined together, and the mechanism operated so quickly, that no time is lost in unloading.

As soon as the unloader has removed the netting B with the load, the wagon may be driven off, and by the time the load is dumped and the netting J back in place another wagon may be in position for unloading. As the height of the stack increases, it is only necessary to increase the inclination of the adjustable back, as described, in order that the load may be thrown out higher. The whole weight of the load is at no time held by the cords N on the main roller L, as the main weight rests either on the header-wagon bottom of unloader or adjustable back, as it is rolled along by the act of raising one end of the netting.

The sides H of the unloader prevent the load from falling out of the netting, and no hay or grain escapes until it is finally dumped onto the stack, or wherever it is required to deposit it.

The unloader may be easily moved about a field to any desired position where a stack is to be formed, or where a thrashing-machine is placed.

Having thus described my invention, what I claim as new, and desire to secure by Letters Patent, is—

1. The wagon A, with its netting B, in combination with the unloader F, with its netting J, fitted to be hooked to the netting B, said nettings being operated by cords from the transverse roller L of the unloader, substantially as shown, and for the purpose herein described.

2. The unloader F, having the sides H and the adjustable back I, supporting the netting and capable of being raised or lowered to suit the height of the stack, substantially as herein described.

3. The unloader F, with its netting J, capable of being joined to the netting B, said unloader being provided with the elevated transverse roller L, with its pulley M and operating-rope Q, by which to raise the nettings and discharge their load, substantially as herein described.

In witness whereof I hereunto set my hand and seal.

NELSON ARCHIBALD. [L. S.]

Witnesses:
GEO. H. STRONG,
FRANK A. BROOKS.